June 25, 1963    A. P. ELDER ETAL    3,095,218
HIGH PRESSURE GAS CONNECTION AND SEAL WHEREIN SAID SEAL
HAS COLLAPSE PREVENTING MEANS
Filed March 25, 1959

INVENTORS.
ALTON P. ELDER
THEODORE P. LE GRAND
BY

*J. M. St. Amand*
ATTORNEYS.

3,095,218
HIGH PRESSURE GAS CONNECTION AND SEAL WHEREIN SAID SEAL HAS COLLAPSE PREVENTING MEANS

Alton P. Elder and Theodore P. Le Grand, China Lake, Calif., assignors to the United States of America as represented by the Secretary of the Navy
Filed Mar. 25, 1959, Ser. No. 801,974
1 Claim. (Cl. 285—8)
(Granted under Title 35, U.S. Code (1952), sec. 266)

The invention described herein may be manufactured and used by or for the Government of the United States of America for governmental purposes without the payment of any royalties thereon or therefor.

The present invention relates to a tubing connector and more particularly to a fitting which is simple to manufacture and assemble, and which is adapted to connect and seal one tubular member to another member providing an effective leak-proof seal against high internal gas pressures.

Previous methods attempted to use O-rings to accomplish the function of the present invention, but the previous methods failed since O-rings leaked at high pressure and had a short life due to excessive wear. The present invention overcomes the disadvantages of previous methods by using a substantially tubular shaped flexible seal in its fitting and utilizing the pressure of the gas passing through the fitting to accomplish a gas-tight seal.

It is an object of the invention therefore to provide a novel means for providing a high pressure gas connection and seal.

Another object of the invention is to provide a new tubing connection and seal capable of withstanding substantial internal pressure and adapted to repeatedly reform a seal when the tubing is repeatedly disconnected and reconnected.

It is a further object of the invention to provide a novel sealing means for high pressure tubing connectors wherein the internal fluid pressure assists in accomplishing the seal and connection.

Other objects and many of the attendant advantages of this invention will be readily appreciated as the same becomes better understood by reference to the following detailed description when considered in connection with the accompanying drawings wherein.

Referring now to the drawings, like numerals refer to like parts in each of the figures.

Figure 1:
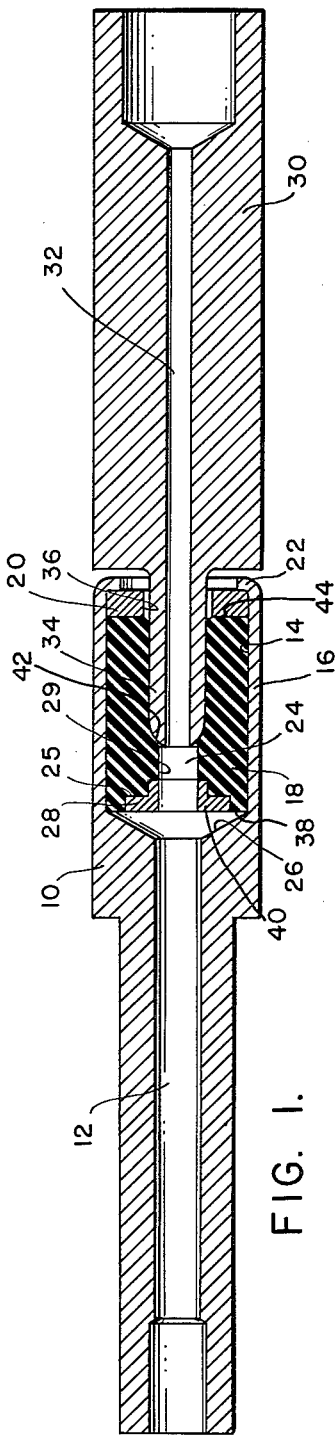
FIG. 1 is a cross-sectional view along the length of a device of the present invention.
Figure 2:
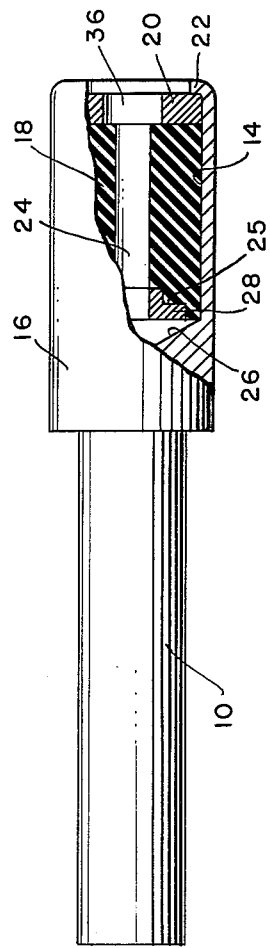
FIG. 2 is an elevational view, partly in cross-section, of the socket portion of the high pressure fitting of FIG. 1.
Figure 3:
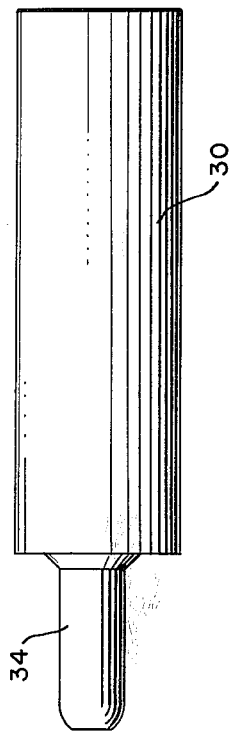
FIG. 3 is an elevational view of the plug-in portion of the high pressure fitting of FIG. 1.

A first conduit portion 10 has a channel 12 passing therethrough which terminates in an enlarged portion 14 at end 16 of the conduit (see FIGS. 1 and 2). An elastic connector seal 18 is fitted within enlarged portion 14 and secured therein by means of a washer 20 at one end thereof held in place by crimping the end of the enlarged wall portion of the conduit at 22. Seal 18 has a channel 24 therethrough in alignment with channel 12; channel 24 has an enlarged inwardly stepped portion 25 at the end thereof which faces the chamfered inner end 26 of the enlarged portion of conduit passage 12. A stepped non-elastic sealing block 28, having a central aperture therein, is seated in the stepped portion 25 of connector seal 18. Sealing block 28 maintains channel 24 open at its end thereof. A second conduit 30 having a channel 32 therethrough has a narrow plug-in portion 34 at one end thereof (see FIGS. 1 and 3). The diameter of portion 34 is slightly smaller than aperture 36 in washer 20 and slightly larger than channel 24 in connector seal 18, thus assuring a snug fit when plug-in portion 34 is inserted into channel 24 in seal 18.

In operation, the first and second conduits are fitted together, as shown in FIG. 1, and gas under pressure is passed through channels 32, 24 and 12 therein. The pressure of this gas is applied against internal surface 29, facial surface 38 and facial surface 40. The forces applied to facial surfaces 38 and 40 cause sealing block 28 and the section of sealing material adjacent facial surface 38 to move longitudinally to the right resulting in compression of the sealing material. The primary force component of this compression is in the longitudinal direction which results in maximum force or sealing characteristics at surfaces 42 and 44. The radial secondary force component causes the sealing material adjacent internal surface 29 to move radially inward resulting in restriction of channel 24. However, the radial outward force applied to internal surface 29, by means of the pressurized gas, is in opposition to this radial inward force which results in a net reduction of the channel restriction. It should be noted that since the combined area of facial surfaces 38 and 40 is considerably greater than the area of internal surface 29, there is a net radial inward force. This is necessary so as to assure that the sealing material will always be in contact with the majority of surface 42 so that the large longitudinal force component against the sealing material forces the sealing material against surface 42 thereby providing maximum sealing action. It has been found that if relatively high gas pressures are employed, it is necessary to remove some of the sealing material adjacent internal surface 29 to prevent undue restriction of the gas flow. It has also been found desirable to have the area of facial surface 38 approximately equal to the area of facial surface 40. This is necessary because when facial surface 38 becomes relatively small, the sealing material adjacent facial surface 38 will be forced longitudinally to the left and not to the right as previously described.

In view of the foregoing it can be seen that sealing block 28 maintains channel 24 open at the end and also provides means for applying a longitudinal force to the sealing material and this longitudinal force applied to the sealing material results in maximum sealing action at surfaces 42 and 44.

The present device eliminates parts which are subject to wear under high mechanical pressure, and further, requires only a slight mechanical force to maintain connection between the first and second conduits.

Obviously, many modifications and variations of the present invention are possible in the light of the above teachings. It is therefore to be understood that within the scope of the appended claim the invention may be practiced otherwise than as specifically described.

What is claimed is:

A manually readily severable conduit connector comprising:
(a) a first conduit having a cylindrical male portion of uniform diameter having a chamfered end,
(b) a second conduit having a female portion of larger diameter than the male portion providing an annular space surrounding the male portion,
(c) said female portion having an annular abutment adjacent one end thereof,
(d) a body of elastic material having a central cylindrical bore of uniform diameter disposed in said annular space and having first and second annular end surfaces,
(e) the first end surface of said body abutting said annular abutment,
(f) the second end surface of said body being subjected to conduit pressure tending to compress it in a direction toward the first end surface and compressing the body radially inwardly onto said male portion, (g) said male portion being inserted into the bore of the body for only a variable portion of the length of the bore and being manually removable axially therefrom, (h) the remaining portion of the bore tending to reduce in diameter to close communication therethrough due to axial compression of the body resulting from pressure applied to said second end face, and (i) a rigid stepped axially movable washer abutting said second end face and recessed into same having a central portion extending toward said end of the first conduit portion and having an opening therethrough concentric with the axis of the bore in said elastic body, but terminating in spaced relation thereto, adapted to prevent said remaining portion of the bore from compressing inwardly and closing communication therethrough.

References Cited in the file of this patent

UNITED STATES PATENTS

| | | |
|---|---|---|
| 169,659 | Rankin | Nov. 9, 1875 |
| 1,586,350 | Bramlette | May 25, 1926 |
| 1,855,803 | Kreidel | Apr. 26, 1932 |
| 1,894,711 | Schacht | Jan. 17, 1933 |
| 1,994,454 | Cross | Mar. 19, 1935 |
| 2,247,163 | Bradley | June 24, 1941 |
| 2,816,472 | Boughton | Dec. 17, 1957 |

FOREIGN PATENTS

| | | |
|---|---|---|
| 5,156 | France | Nov. 8, 1905 |
| 798,430 | France | May 16, 1936 |
| 57,438 | France | Jan. 28, 1953 |
| 726,484 | Great Britain | Mar. 16, 1955 |